(12) United States Patent
Smith

(10) Patent No.: US 7,260,197 B2
(45) Date of Patent: Aug. 21, 2007

(54) CALL BLOCKING DEVICE AND METHODS

(75) Inventor: Bryan M. Smith, Cullman, AL (US)

(73) Assignee: AT&T Intellectual Property, Inc., Wilmington, DE (US)

( * ) Notice: Subject to any disclaimer, the term of this patent is extended or adjusted under 35 U.S.C. 154(b) by 0 days.

(21) Appl. No.: 10/936,073

(22) Filed: Sep. 8, 2004

(65) Prior Publication Data

US 2006/0050858 A1 Mar. 9, 2006

(51) Int. Cl.
*H04M 1/56* (2006.01)
*H04M 3/42* (2006.01)

(52) U.S. Cl. ................... 379/142.06; 379/142.02; 379/210.02

(58) Field of Classification Search ............ 379/142.06, 379/210.02, 142.02
See application file for complete search history.

(56) References Cited

U.S. PATENT DOCUMENTS

| 6,654,452 | B1* | 11/2003 | Murray et al. | 379/197 |
| 6,690,784 | B2* | 2/2004 | Renner et al. | 379/210.02 |
| 2002/0009184 | A1* | 1/2002 | Shnier | 379/142.01 |

* cited by examiner

*Primary Examiner*—Barry Taylor

(57) ABSTRACT

A caller ID device includes a switch and a control circuit in communication with the switch, wherein the control circuit includes a memory, the memory having a table of blocked calls, and wherein each of the blocked calls is identified as a blocked call in response to a user activating the switch.

16 Claims, 5 Drawing Sheets

CALL BLOCKING DEVICE AND METHODS

BACKGROUND

Embodiments of the present invention relate generally to telephones and more particularly to call blocking using, e.g., a caller ID device.

Caller Identification (hereinafter "caller ID") is a feature provided by local phone companies that sends information from the telephone network to a telephone device between the first and second rings. The information that is sent varies and generally includes the calling telephone number and the name of the caller. This information is sent via the telephone line in a digital data packet that is usually Frequency Shift Keyed (hereinafter "FSK") modulated. At the receiving telephone device the subscriber must be signed up for the caller ID service and must have a caller ID data receiver, i.e., a caller ID unit, connected to the telephone line in order to receive the digital data packet containing the caller ID information for the calling telephone device. The data receiver receives the FSK modulated digital data packet and provides a visual display of the information. In operation, the caller ID unit receives the FSK modulated digital data packet, demodulates it and converts the information into a stream of text characters that is then displayed, for example, on a liquid crystal display (LCD) provided either on the caller ID unit or which is integral to the telephone device itself. As discussed before, for an incoming call, the caller ID information that is displayed at the receiving side can include the name and number of the calling party among other types of information. The central office must have "caller ID capability" and the service must be enabled within the central office of the local telephone exchange. If, however, the central office does not have caller ID capability, the called party will receive a variety of messages including, for example, "out of area."

Among the information that is displayed on the caller ID unit is the originating telephone number and the name listed in the directory under that number. In other words, the name that is displayed is the name that the telephone company has entered into a database and believes to be that of its customer. The number in the local central office database also aids another database lookup and thus associates the name in the directory with the number from where the call originates. The calling party's name and number information is transmitted through the central office and the telecommunication network and ultimately is displayed at the caller ID unit or on the telephone device itself. As discussed hereinbefore, such caller ID information is generally transmitted and displayed between the first and second rings. For caller ID to work properly in a telecommunication environment, the telecommunication network switches must be supported by Common Channel Signaling (CCS) and the party initiating the call must originate it from a single-channel line, a multi-channel trunk line with ANI/Calling Party ID. Further, if the originating line or caller blocks the transmission of the caller ID information, the receiving party will not be able to view the information or the receiving device will display, for example, "ANONYMOUS," "NOT AVAILABLE" or "PRIVATE CALLER."

SUMMARY

According to exemplary embodiments a caller ID device includes a switch and a control circuit in communication with the switch, wherein the control circuit includes a memory, the memory having a table of blocked calls, and wherein each of the blocked calls is identified as a blocked call in response to a user activating the switch.

According to other exemplary embodiments, a system includes a calling telephone device in communication with a telecommunication network and a caller ID device in communication with the telecommunications network. The caller ID device includes a switch and a control circuit in communication with the switch, the display and the ringer circuit, wherein the control circuit includes a memory, the memory having a table of blocked calls, and wherein each of the blocked calls is identified as a blocked call in response to a user activating the switch.

In various other exemplary embodiments, a method includes receiving an indication of a user activating a switch on a caller ID device and identifying, via a control circuit in the caller ID device, the control circuit having a memory that has a table of blocked calls, a call as a blocked call in response to the user activating the switch.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

Advantages of the invention may be better understood by referring to the following description taken in conjunction with the accompanying drawings, in which.

DETAILED DESCRIPTION

Figure 1:
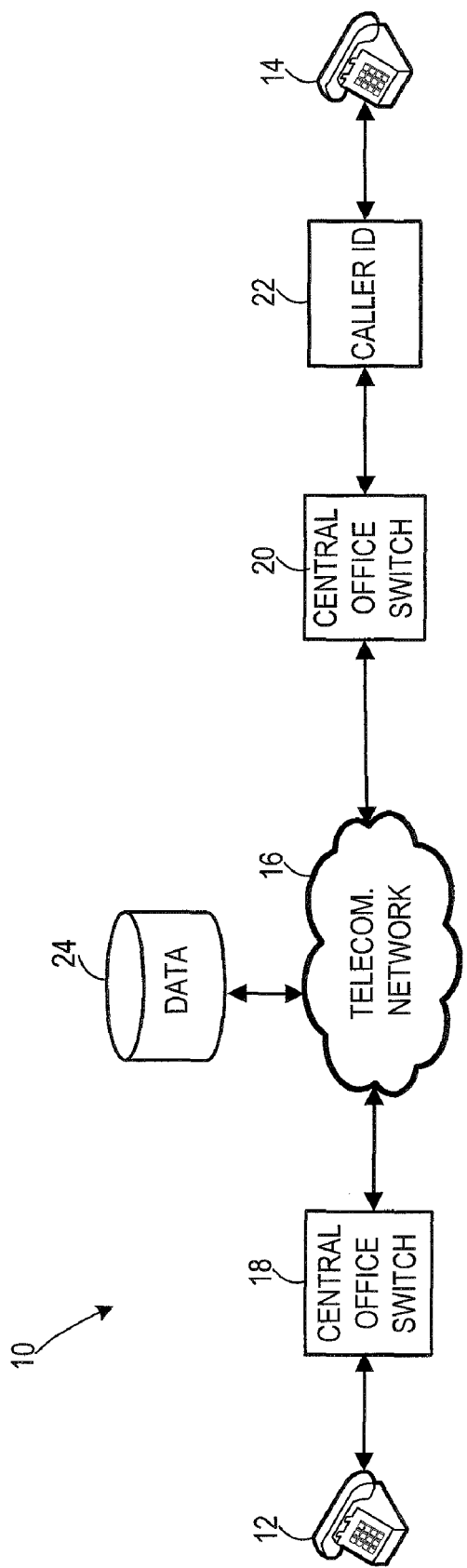
FIG. 1 illustrates an example of a caller ID system.

Turning now to the drawings, wherein like reference numerals refer to like elements, the various embodiments of the invention are illustrated as being implemented in a suitable general-purpose environment. In one embodiment, although not necessarily limited to such environment, the invention comprises in the general context an apparatus comprising a device that enables a user to block calls originating from predetermined telephone numbers.

The term "calling party" is used herein generally to refer to the person or unit that initiates a telecommunication. The calling party may also be referred to herein as "caller." In some cases, the calling party may not be a person, but may be a device such as a facsimile machine, an answering service, a modem, etc. The terms "called party" and "user" are used herein generally to refer to the person or unit that answers or responds to the call or communication. The term "communication" is used herein to include all messages or calls that may be exchanged between a calling party and a called party, including voice, data and video messages. The term "communication" is used synonymously herein with the term "call" unless a distinction is noted. The term "subscriber" is used herein to generally refer to a subscriber of the described telecommunications service.

FIG. 1 illustrates an example of a caller ID system 10. The system 10 includes a calling telephone device 12 connected to a first central office switch 18 that originates a call to a first receiving telephone device 14 connected to a second central office switch 20. The call propagates through a telecommunication network 16 that provides a connection between the first central office switch 18 and the second central office switch 20. The receiving telephone device 14 includes a conventional caller ID unit 22 that is separate and detached from the telephone device 14. The system 10 also includes a directory database 24 in communication with the telecommunication network 16. It can be understood that, in various embodiments, the calling telephone device 12 may be connected to the telephone device 14 via the central office switch 18 if, for example, the calling telephone device 12 is in the same local calling area as the telephone device 14.

Figure 2:
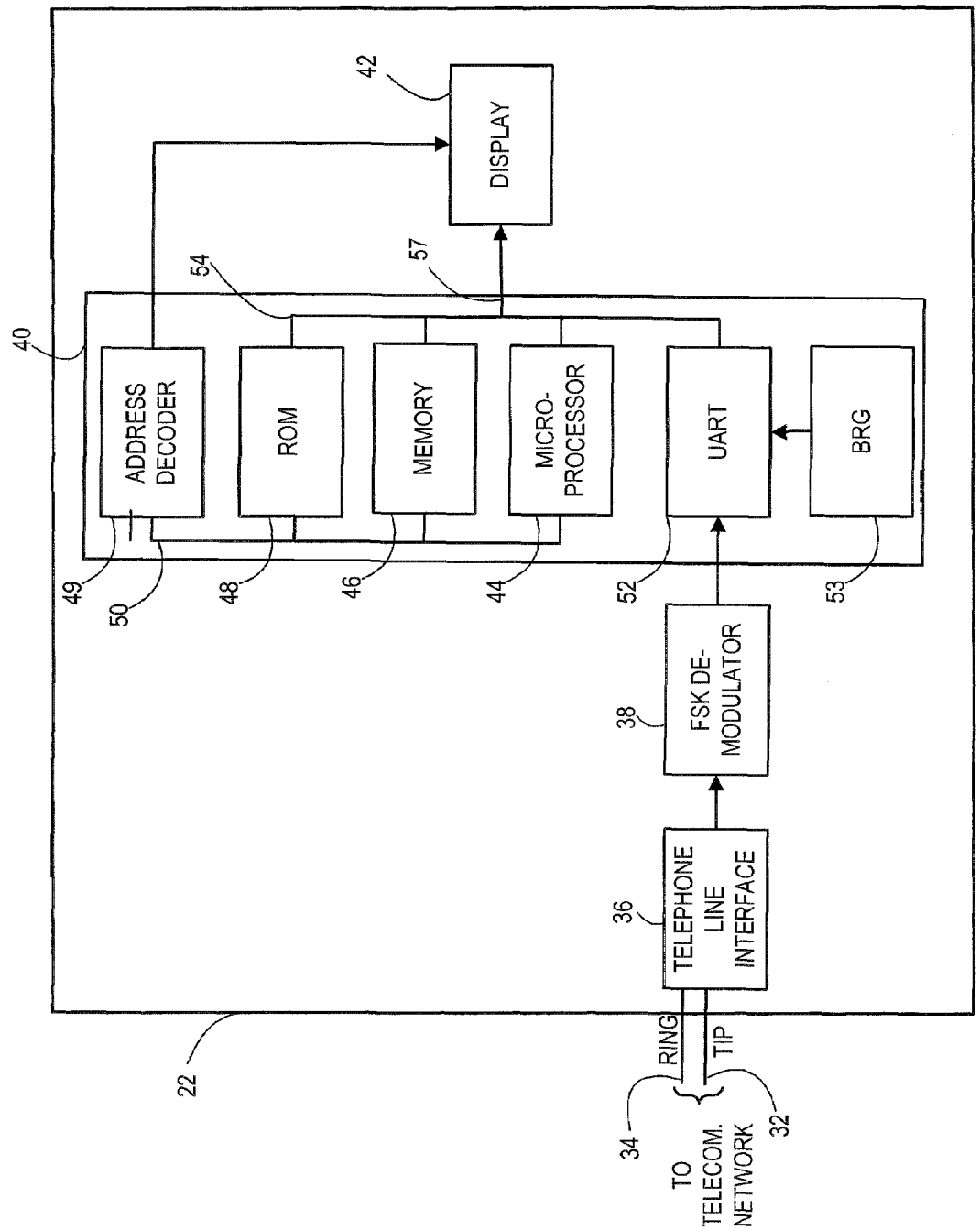
FIG. 2 illustrates one embodiment of the caller ID unit of FIG. 1.

FIG. 2 illustrates one embodiment of the caller ID unit 22 of FIG. 1. The caller ID unit 22 includes a telephone line interface circuit 36, a demodulator circuit 38, a control circuit 40 and an alphanumeric display 42. The control circuit 40 can be a single chip computer or can be implemented using discrete integrated circuits depending on the specific application. The control circuit 40 includes, in the most general sense, a microprocessor 44, a memory circuit 46 and a read only memory circuit 48 (ROM). The control circuit 40 also includes a universal asynchronous receiver transmitter 52 (UART) and a baud rate generator (BRG) 53. Also included are an address bus 50 and a data bus 54 for interconnecting the various units as shown and an address decoder 49 for selecting various peripheral devices that the control circuit 40 interfaces with such as, for example, the alphanumeric display 42.

In operation the caller ID unit 22 receives FSK modulated caller ID signals during an interval between intermittent ringing signals from the central office switch 20. The FSK modulated caller ID signals contain a channel seizure stream that is followed by a mark stream and then the actual caller ID information. The caller ID information is sent in a Single Data Message Format (hereinafter "SDMF") containing the calling number or in a Multiple Data Message Format (hereinafter "MDMF") containing the calling number and the name associated with that number. The number and name fields may contain additional data to indicate that the caller has blocked the information or that the information is not available. The additional data includes, for example, single bit markers that are interpreted for display.

The FSK modulated caller ID signals are received at the tip 32 and ring 34 side of the telephone line. These signals are then passed through the telephone line interface circuit 36 where they are filtered and amplified. The filtered and amplified signals are then coupled to the FSK demodulator circuit 38 where the modulated signals are converted to a serial bit stream representation of the caller ID data message. The serial bit stream is then fed to the UART 52, which converts the serial bit stream into a parallel bit format. The parallel bit formatted stream is interpreted as a series of characters comprising the caller ID information data by the microprocessor 44. The microprocessor 44 then periodically updates the alphanumeric display 42 with each character comprising the parallel bit formatted stream. For details of components typically included in a caller ID unit, reference is made to U.S. Pat. No. 4,582,956 to Doughty, which is herein incorporated by reference in its entirety.

Figure 3:
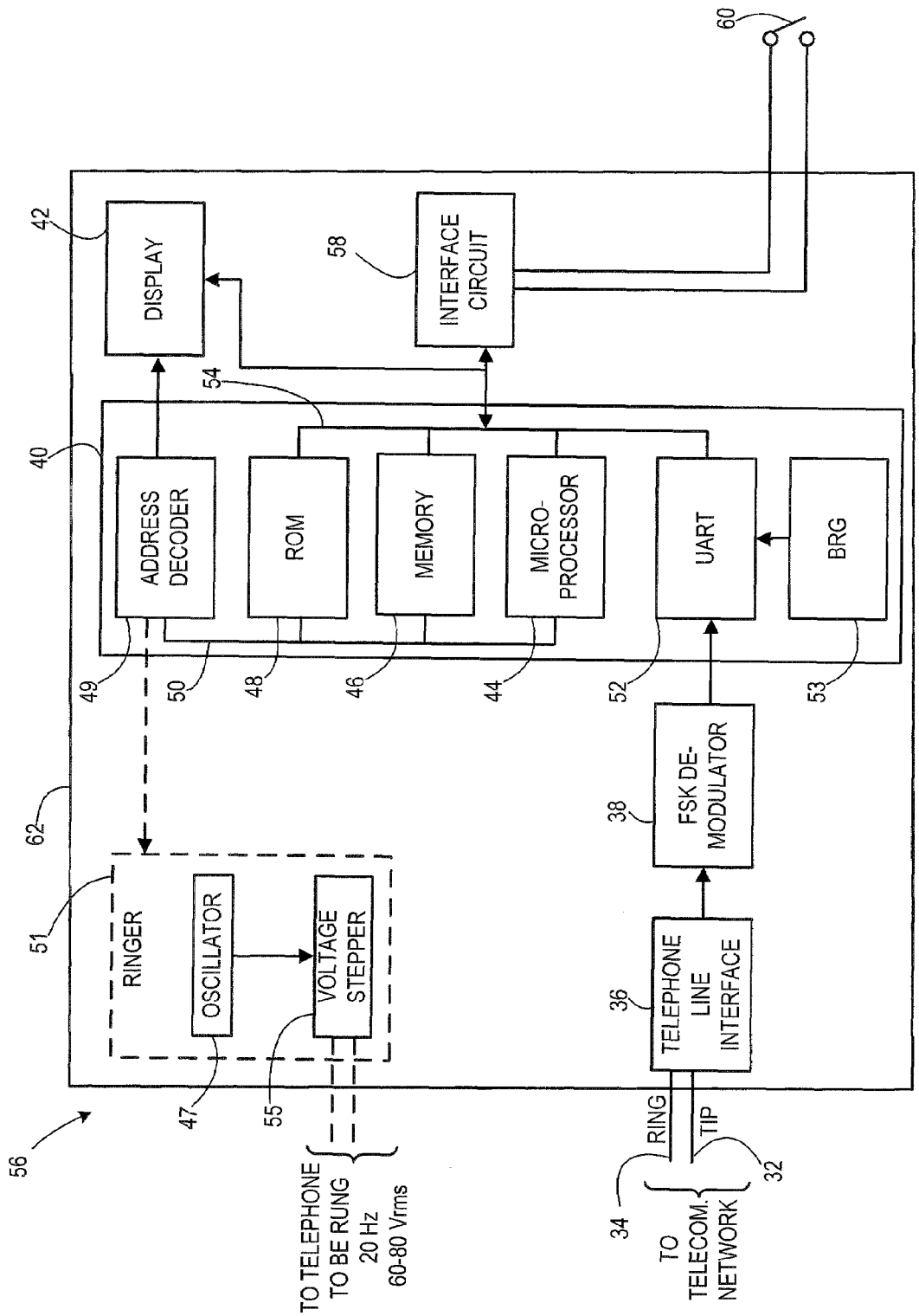
FIG. 3 illustrates an exemplary embodiment of a caller ID unit having enhanced capabilities.

FIG. 3 illustrates one exemplary embodiment of a caller ID unit 56 having enhanced capabilities that can be used in, for example, the system 10 of FIG. 1. According to this embodiment, the caller ID unit 56 comprises a telephone line interface circuit 36 connected to the tip 32 and ring 34 lines of the telephone line, an FSK demodulator circuit 38, a control circuit 40 and an interface circuit 58. The interface circuit 58 accepts input from a switch 60 that is located on, for example, a housing of the caller ID unit 56. The interface circuit 58 may also accept input from other input switches such as, for example, review buttons that allow a user of the caller ID unit 56 to scroll through a list of previously-received caller ID information and a delete button that allows a user of the caller ID unit 56 to delete one or more displayed caller ID information entries. The switch 60 may be, for example, a push-button switch or any type of other device for accepting input from the user of the caller ID unit 56.

In operation, a user of the caller ID unit 56 may depress the push-button switch 60 when the user desires to indicate to the caller ID unit 56 that the user does not want to receive future calls from a telephone number that is displayed on the display 42. Thus, a user may scroll through the numbers held in the memory 46 of the caller ID unit 56 and, when the user desires to block future calls from the number indicated on the display 42, the user may depress the push-button switch 60. The push-button switch 60 may be labeled, for example, "block" or "ignore." When the user indicates that future calls from a particular calling number are to be blocked, the caller ID information relating to that number is stored in the memory 46 in, for example, a table of blocked calling numbers. When future calls are received by the caller ID unit 56, the caller ID unit compares the incoming caller ID information with the numbers stored in the table of blocked calling numbers in the memory 46. A match indicates that the incoming call should be blocked.

In various embodiments, when the user of the caller ID unit 56 scrolls through the list of previously-received calls displayed on the display 42, those numbers from which the user has indicated that future calls should be blocked may be marked with, for example, a character or set of characters (e.g., "block") to indicate that future calls will be blocked. Such an indication may be present when caller ID information is displayed relating to a number that is stored in the caller ID block table in the memory 46. In various embodiments, the caller ID unit 56 may allow a user to remove a block indication on an entry in the list of previously-received calls by, for example, depressing the push-button switch 60. In various embodiments, the caller ID unit 56 may allow a user to scroll through and perform operations on the caller ID block table via a list that is presented separately from the list of recently received calls. In such embodiments, the list of blocked calls may include the time the call was received, etc.

The control circuit 40 can be realized as a single chip computer or can be realized using discrete integrated circuits depending on the particular application. The control circuit 40 includes in the most general sense a microprocessor 44, a memory circuit 46 and a ROM circuit 48. The control circuit 40 also includes a UART 52 and baud rate generator 53 (BRG). Also included in the control circuit 40 are an address bus 50 and a data bus 54 for interconnecting the various units as shown and an address decoder 49 for selecting various peripheral devices that the control circuit 40 interfaces with such as, for example, the display 42.

In one embodiment the control circuit 40 is configured such that the caller ID unit 56 can capture and hold the ring signals from the telephone line as well as the caller ID information relating to the originating telephone device 12. For example, in one embodiment the caller ID unit 56 captures an incoming telephone ring signal to prevent the telephone device from ringing. The control circuit 40 can be programmed so as to provide the ring signal to the telephone device after the entire caller ID information stream has been captured, compared with information relating to telephone numbers from which calls should be blocked, stored, displayed, etc. In one embodiment, this function can be realized by providing a separate ringer circuit 51. The ringer circuit 51 starts an oscillator 47 after receiving an enable signal from the address decoder 49 when the control circuit 40 has collected the entire caller ID information stream and the microprocessor has compared the caller ID information with blocked telephone numbers stored in the memory 46 and has determined that the caller ID information does not match that of a blocked telephone number. In one embodiment, the output of the oscillator 47 can be provided to a voltage stepper circuit 55 to generate a 60-80 VRMS signal at 20 Hz, for example, if the ringer circuit 51 is to drive a conventional ringer. Otherwise, in one embodiment, the output of the oscillator 47 can be provided to a logic circuit for generating ringing tones or ringing pulses for a solid-state buzzer or a piezoelectric type ringer.

As discussed above the caller ID information relating to the originating telephone device 12 can include the originating telephone number and the name associated with that number that is stored in the directory database 24 in communication with the telecommunication network 16. In operation the caller ID unit 22 receives FSK modulated caller ID signals during an interval between intermittent ringing signals from the central office switch 20. In one embodiment the caller ID information can include the FSK modulated caller ID signals containing, for example, a channel seizure stream that is followed by a mark stream and then the actual caller ID information. The caller ID information can be sent in a Single Data Message Format (SDMF) containing the calling number or the Multiple Data Message Format (MDMF) containing the calling number and the name associated with that number. The number and name fields may contain additional data for indicating that the caller has blocked the information or that the information is not available. The caller ID information, however, also can include a variety of information especially as local exchange switches and signaling systems become more complex and provide additional features and functionality. Accordingly, the scope of the invention should not be considered to be limited to any specific message, text or character stream format or content.

Figure 4:
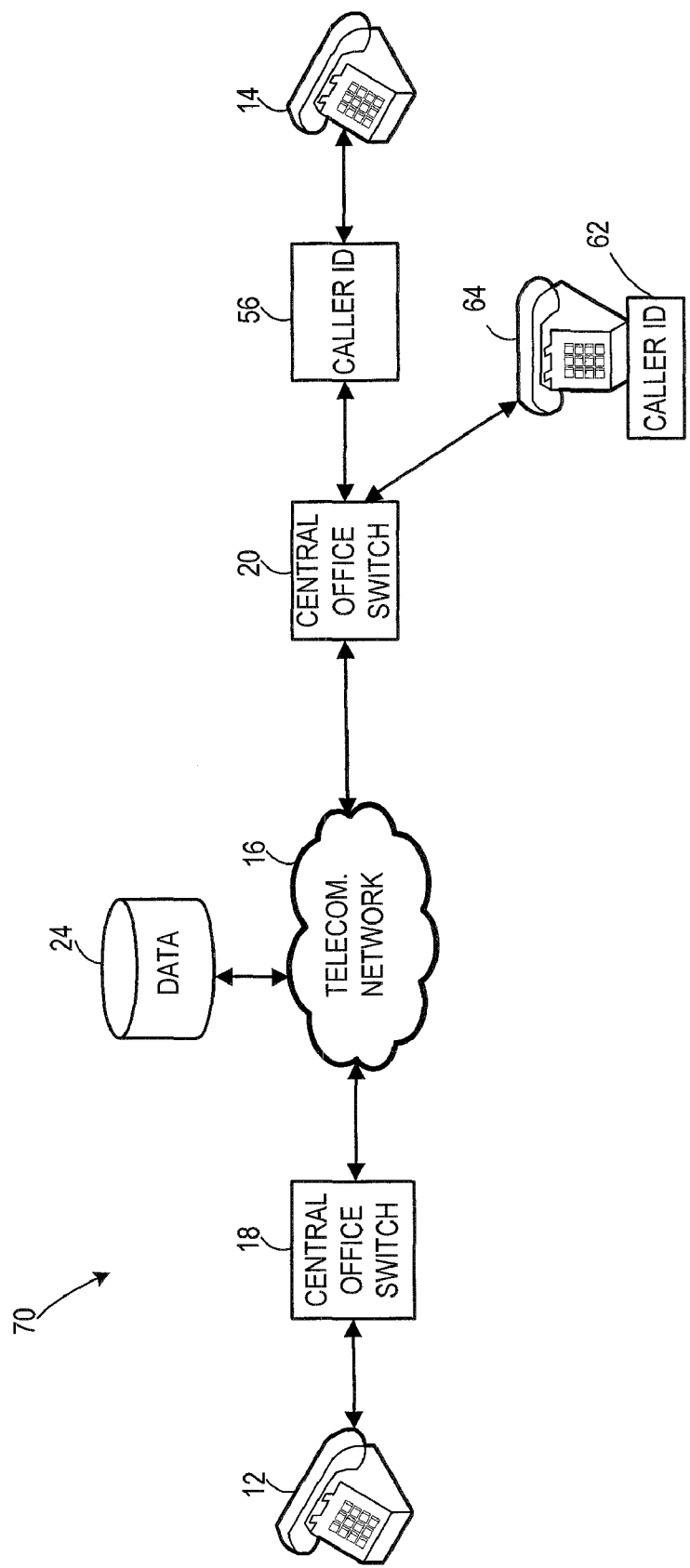
FIG. 4 illustrates one exemplary embodiment of a system in which the caller ID unit shown in FIG. 3 may be used.

FIG. 4 illustrates one embodiment of a system 70 in which the caller ID unit 56 may be used. As described hereinbefore, the central office switch 20 transmits information relating to a calling telephone device 12 that originates a call to a first receiving telephone device 14. The call propagates through a telecommunication network 16 providing a connection between a first central office switch 18 to which the calling telephone device 12 is connected and a second central office switch 20 to which the first receiving telephone device 14 is connected. The first receiving telephone device 14 is shown herein connected to the caller ID unit 56, which is separate and detached from the telephone device 14. Another example includes a second receiving telephone device 64 having an integral caller ID unit 62. The second receiving caller ID unit 62 can be utilized to capture the first ring and then capture the entire modulated caller ID information stream before passing the first ring signal to the second telephone device 64 if the user of the telephone device 64 has not previously indicated that calls from the number associated with the calling telephone device 12 should be blocked. In one embodiment, the second telephone device 64 can be adapted to operate in a GSM environment (Groupe Speciale Mobile, aka Global System for Mobile Communication). Accordingly, ring signals are passed directly to the caller ID unit 62 rather than directly to the second telephone device 64. The caller ID unit 62 traps the ring signals, thus keeping the second telephone device 64 quiet while the caller ID unit 62 receives all of the caller ID information. The caller ID unit 62 releases the ring signals to the second telephone device 64 once it has received the entire stream of caller ID information and has determined that the user of the second telephone device 64 has not blocked calls originating from the calling telephone device 12. The ring circuit 51 can be used to output the ring signal to the telephone device 64 if the control circuit 40 enables it via the address decoder 49, for example. It can be understood that, in various embodiments, the calling telephone device 12 may be connected to the telephone device 14 via the central office switch 18 if, for example, the calling telephone device 12 is in the same local calling area as the telephone device 14.

Figure 5:
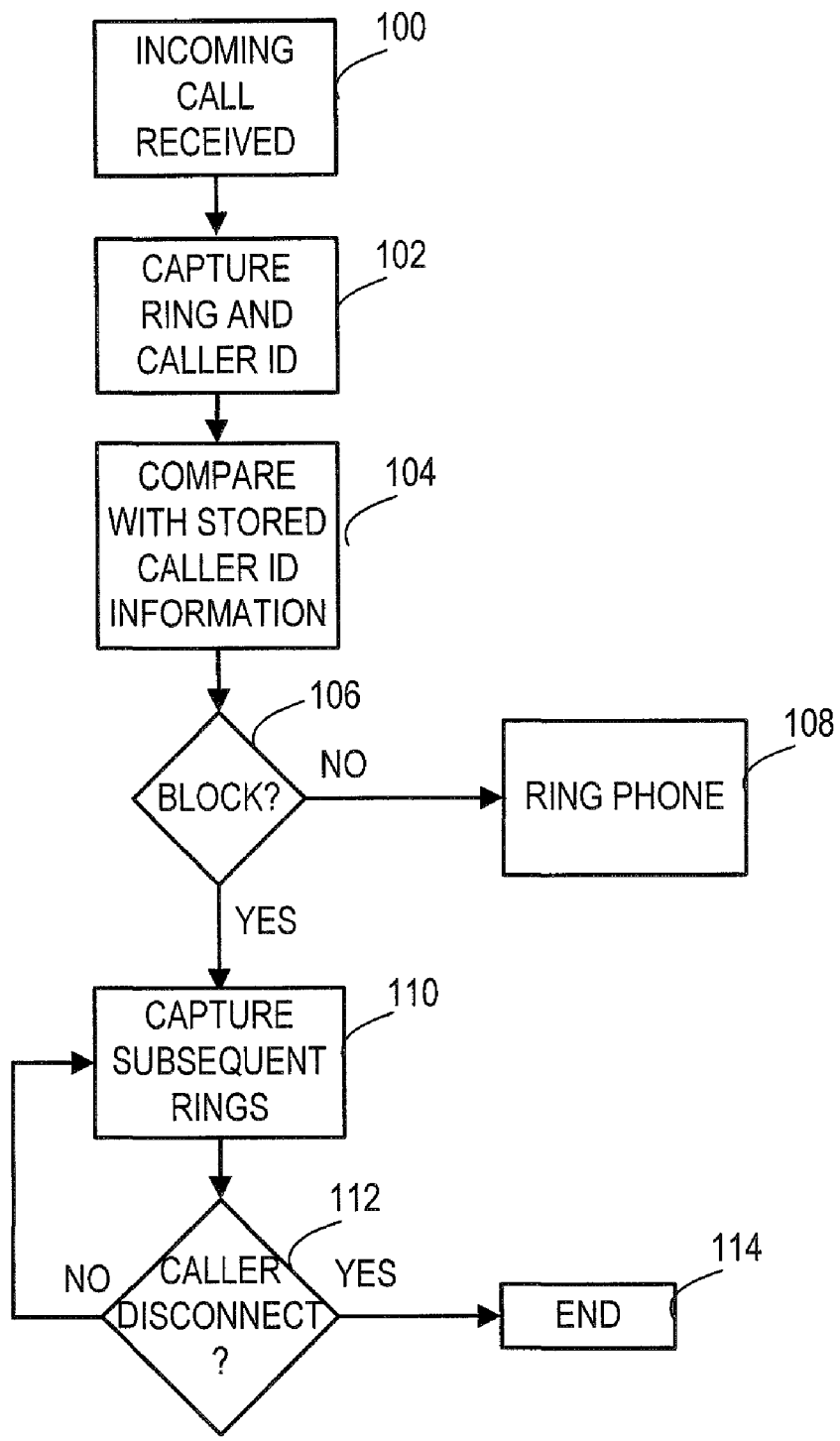
FIG. 5 illustrates an exemplary embodiment of a process performed by the caller ID unit shown in FIG. 3.

FIG. 5 illustrates an embodiment of a process performed by a caller ID unit 56, such as the caller ID units 56 and 62. At step 100, an incoming call is received by the caller ID unit. At step 102, the ring and caller ID information relating to the call are captured by the caller ID unit. At step 104, the captured caller ID information is compared with information stored in a blocked caller ID table that is stored in memory, such as memory 46. At step 106, it is determined if a user of the caller ID unit previously marked calls as originating from the calling party, as determined by its caller ID information, should be blocked. If the call should not be blocked, the ring is forwarded to a telephone device, such as the telephone device 14, at step 108.

If the call should be blocked as determined at step 106, subsequent rings from a calling telephone device, such as the calling telephone device 12, are captured at step 110 by the caller ID unit. At step 112, the caller ID unit determines whether the caller has disconnected. If the caller has not disconnected, subsequent rings are captured at step 110. If the caller has disconnected, the process ends at step 114.

It can be understood that, in various embodiments, a user of the caller ID unit can access the blocked caller ID table stored in the memory to, for example, remove an entry from the table such that future calls may be received from a calling telephone device from which calls were previously identified in the table as being blocked. Also, in various embodiments, the caller ID unit may automatically remove an entry from the blocked caller ID table stored in the memory after a predetermined time period has elapsed. The predetermined time period may be a set time period or a time period that is specified by a user of the caller ID unit.

The term "computer-readable medium" as used herein may include, for example, magnetic and optical memory devices such as diskettes, compact discs of both read-only and writeable varieties, optical disk drives, and hard disk drives. A computer-readable medium may also include memory storage that can be physical, virtual, permanent, temporary, semi-permanent and/or semi-temporary. A computer-readable medium may further include one or more data signals transmitted on one or more carrier waves.

Various aspects of various embodiments of the present invention can be implemented in computer software code using, for example, Visual Basic, C, or C++ computer languages using, for example, object-oriented techniques.

While several exemplary embodiments of the invention have been described, it should be apparent, however, that various modifications, alterations and adaptations to those embodiments may occur to persons skilled in the art with the attainment of some or all of the advantages of the present invention. For example, although embodiments of the invention have been described in which a standalone or integral caller ID unit is used in connection with a wireline telecommunications network, it can be understood that the teachings of the present invention can be used in connection with any type of telecommunications network, including wireless and wireline networks. It is therefore intended to cover all such modifications, alterations and adaptations without departing from the scope and spirit of the present invention as defined by the appended claims.

What is claimed is:

1. A caller ID device, comprising:
    a switch; and
    a control circuit in communication with the switch,
    wherein the control circuit includes a memory, the memory having a table of blocked calls, and wherein each of the blocked calls is identified as a blocked call in response to a user activating the switch;
    wherein further, the control circuit removes each of the blocked calls automatically from the table of blocked calls after a predetermined time period has elapsed after being identified as a blocked call;
    wherein further still, the control circuit captures a first ring signal and any subsequent ring signals from an incoming call thereafter releasing the first ring signal and any subsequent ring signals to a ring circuit after the incoming call is determined not to be a blocked call.

2. The device of claim 1, wherein the device is a standalone caller ID device or a caller ID device integrated with the telephone device.

3. The device of claim 1, wherein the control circuit further comprises a processor and an address decoder.

4. The device of claim 1, further comprising a ringer circuit.

5. The device of claim 1, wherein the switch is a push-button switch.

6. A system, comprising:
    a calling telephone device in communication with a telecommunication network; and
    a caller ID device in communication with the telecommunications network, the caller ill device including:
    a switch; and
    a control circuit in communication with the switch, the display and the ringer circuit, wherein the control circuit includes a memory, the memory having a table of blocked calls, and wherein each of the blocked calls is identified as a blocked call in response to a user activating the switch;
    wherein further, the control circuit removes each of the blocked calls automatically from the table of blocked calls after a predetermined time period has elapsed after being identified as a blocked call;
    wherein further still, the control circuit captures a first ring signal and any subsequent ring signals from an incoming call thereafter releasing the first ring signal and any subsequent ring signals to a ring circuit after the incoming call is determined not to be a blocked call.

7. The system of claim 6, further comprising at least one central office switch in communication with the calling telephone device and the telecommunication network.

8. The system of claim 6, wherein the caller ID device is integral to a called telephone device or a standalone caller ID device.

9. The system of claim 6, further comprising a directory database in communication with the telecommunication network.

10. The system of claim 6, wherein the switch is a push-button switch.

11. The system of claim 6, wherein the control circuit includes a processor and an address decoder.

12. The system of claim 6, wherein the caller ID device further includes the ringer circuit.

13. A method, comprising:
    receiving an indication of a user activating a switch on a caller ID device; and
    identifying, via a control circuit in the caller ID device, the control circuit having a memory that has a table of blocked calls, a call as a blocked call in response to the user activating the switch
    wherein, the control circuit removes each of the blocked calls automatically from the table of blocked calls after a predetermined time period has elapsed after being identified as a blocked call;
    wherein further still, the control circuit captures a first ring signal and any subsequent ring signals from an incoming call thereafter releasing the first ring signal and any subsequent ring signals to a ring circuit after the incoming call is determined not to be a blocked call.

14. The method of claim 13, wherein receiving an indication of a user activating a switch on a caller ID device includes receiving an indication of a user activating a switch on a standalone caller ID device or a caller ID device integrated with a telephone device.

15. The method of claim 13, further comprising accepting input from the user to permit the user to scroll through the table of blocked calls.

16. A computer-readable medium having stored thereon instructions which, when executed by a processor, cause the processor to:
    receive an indication of a user activating a switch on a caller ID device; and
    identify, via a control circuit in the caller ID device, the control circuit having a memory that has a table of blocked calls, a call as a blocked call in response to the user activating the switch
    wherein, the control circuit removes each of the blocked calls automatically from the table of blocked calls after a predetermined time period has elapsed after being identified as a blocked call;
    wherein further still, the control circuit captures a first ring signal and any subsequent ring signals from an incoming call thereafter releasing the first ring signal and any subsequent ring signals to a ring circuit after the incoming call is determined not to be a blocked call.

* * * * *